United States Patent [19]

Lagoutte et al.

[11] Patent Number: 5,757,770
[45] Date of Patent: May 26, 1998

[54] METHOD AND DEVICE FOR THE CONTROL OF CONGESTION IN SPORADIC EXCHANGES OF DATA PACKETS IN A DIGITAL TRANSMISSION NETWORK

[75] Inventors: Pierre Lagoutte, Issy Les Moulineaux; Thierry Grenot, Clamart, both of France

[73] Assignee: Thomson-CSF, Paris, France

[21] Appl. No.: 541,704

[22] Filed: Oct. 10, 1995

[30] Foreign Application Priority Data

Oct. 11, 1994 [FR] France ................. 94 12105

[51] Int. Cl.$^6$ ................................. H04L 12/56
[52] U.S. Cl. ............................... 370/229; 370/389
[58] Field of Search ........................ 370/224, 230,
370/231, 233, 234, 235, 236, 237, 238,
389, 391, 395, 397, 399, 407, 411, 412,
413, 414, 416, 417, 418, 428, 429

[56] References Cited

U.S. PATENT DOCUMENTS

| | | | |
|---|---|---|---|
| 4,424,417 | 1/1984 | Chavey et al. | 370/319 |
| 4,785,464 | 11/1988 | Judeinstein et al. | 375/211 |
| 4,999,835 | 3/1991 | Lagoutte | 370/389 |
| 5,117,429 | 5/1992 | Lagoutte | 370/413 |
| 5,166,894 | 11/1992 | Saito | 370/395 |
| 5,220,563 | 6/1993 | Grenot et al. | 370/396 |
| 5,267,232 | 11/1993 | Katsube et al. | 370/395 |
| 5,274,680 | 12/1993 | Sorton et al. | 375/371 |
| 5,381,410 | 1/1995 | Grenot | 370/352 |
| 5,394,393 | 2/1995 | Brisson et al. | 370/392 |

OTHER PUBLICATIONS

Peter Newman, "Backward Explicit Congestion Notification for ATM Local Area Networks," IEEE Global Telecommunications Conference, Houston, Texas; vol. 2 of 4, Nov. 29–Dec. 2, 1993; pp. 719–723.

H. Jonathan Chao, "Design Of Leaky Bucket Access Control Schemes in ATM Networks," International Conference on Communications 91; vol. 1 of 3, Jun. 23–26, 1991; pp. 180–187.

H. Jonathon Chao, "A General Architecture for Link–Layer Congestion Control in ATM Networks," International Switching Symposium, Yokohama, Japan; vol. 1,Oct. 25–30, 1992; pp. 229–233.

*Primary Examiner*—Dang Ton
*Attorney, Agent, or Firm*—Oblon, Spivak, McClelland, Maier & Neustadt, P.C.

[57] ABSTRACT

The method enables the control of congestion in sporadic exchanges of packets of data in a digital transmission network. Each packet is formed by a header enabling it to be identified and to be guided through virtual channels and by a part containing information elements to be conveyed. The method includes detecting, at each node of the network, channels that are congested, and, on nodes upline with respect to each congested virtual channel detected, transmitting a congestion indicator to stop connections on the congested virtual channels so long as the congestion observed by a node on the congested virtual channels has not been cleared.

4 Claims, 1 Drawing Sheet

METHOD AND DEVICE FOR THE CONTROL OF CONGESTION IN SPORADIC EXCHANGES OF DATA PACKETS IN A DIGITAL TRANSMISSION NETWORK

BACKGROUND OF THE INVENTION

The present invention relates to a method and a device for the control of congestion in sporadic exchanges of data packets in a digital transmission network. It can be applied notably to the setting up of local area networks working in the asynchronous transfer mode or ATM.

In a network working in ATM, the digital information elements are exchanged between nodes of the network in the form of packets or cells of bits having a fixed format. Each cell is formed firstly by a header used to identify the cell and the call or connection to which it belongs, and secondly, an information field containing the useful data to be conveyed. The nodes of the network have the task of routing the ATM cells that are applied to their inputs towards one or more outputs.

In these networks the active users who are making connections share the available bandwidth according to different modes of operation. In a first mode, a portion of the bandwidth is reserved for each active user, whether or not he is transmitting (the reservation pertains, for example, to peak time flows). In this case, however, the portion of the bandwidth that is reserved and not used by active users, who are not transmitting, cannot be allocated to other users. In another procedure, there is no reservation of resources in the network which takes responsibility for carrying out the statistical multiplexing of the information elements that are really transmitted. However, it is possible that, at a given instant, the users may send out more information than the network is capable of letting through. This will result in a loss of a part of this information (in the phenomenon known as congestion). To prevent congestion of a network from disturbing the entire network, a method of regulation known as ABR (available bit rate) may be implemented. This method enables the effective sharing of the available bandwidth among the active users, preventing the congestion of a network.

Mechanisms known as FECN (forward explicit congestion notification) and BECN (backward explicit congestion notification) are then applied. These mechanisms are used to block the active sources when the network starts getting into a state where it can no longer let through all the traffic entrusted to it. An associated releasing mechanism is used to avert the permanent blocking of these sources.

However, in certain anomalous cases, for example when there is a disconnection of linking cables or the malfunctioning of the components that form the nodes, it may happen that sources do not receive information elements on congestion and continue to make transmission and hence create congestion in the network. It may also happen that the blocked sources receive no releasing information and remain blocked for very lengthy periods of time, which is detrimental to the applications using the network.

SUMMARY OF THE INVENTION

The aim of the invention is to overcome the above-mentioned drawback.

To this end, an object of the invention is a method for the control of congestion in sporadic exchanges of packets of data in a digital transmission network, each packet being formed by a header enabling it to be identified and to be guided through virtual channels and by a part containing information elements to be conveyed, the method including, at each node of the network, detecting congested channels and 1, on the nodes placed upline with respect to each virtual channel detected as being congested, transmitting a congestion indicator to stop connections on this channel so long as the congestion observed by a node on the channel has not been cleared.

BRIEF DESCRIPTION OF THE DRAWINGS

Other features and advantages of the invention shall appear from the following description, made with reference to the appended drawings, of which.

DESCRIPTION OF THE INVENTION

Figure 1:
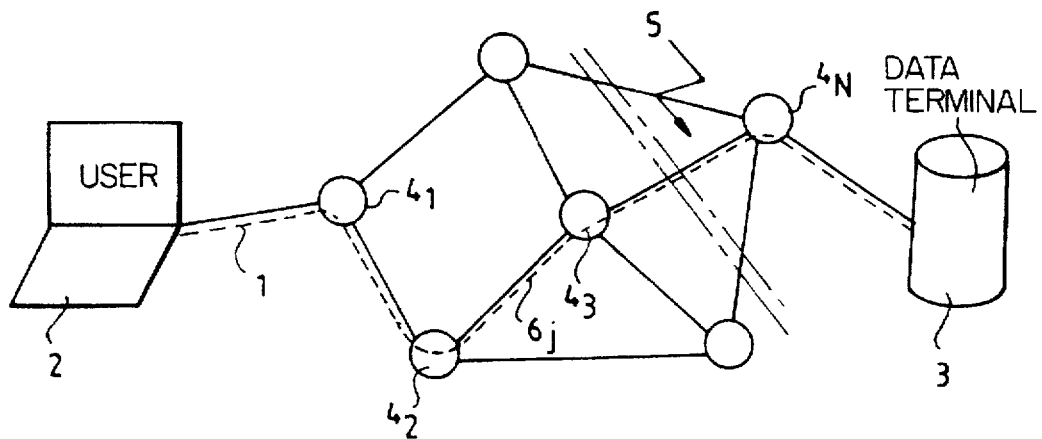
FIG. 1 shows an example to illustrate a connection in an ATM network.

In the example of FIG. 1, the path taken by a connection between a user 2 and a data terminal 3 is illustrated by a line of dashes 1. The path following the line 1 is formed by a cascade connection of communications nodes $4_1$ to $4_N$ of an ATM local area network 5 communicating with one another on arteries $6j$.

The information elements exchanged on the arteries $6j$ are given in packets or cells of bits with a fixed format. Each cell consists of an information field and a header enabling the cell to be identified and notably enabling the making of the connection to which it belongs. The role of the nodes $4_1$ to $4_N$ is to route the cells arriving at their inputs towards one or more of their outputs.

Figure 2:
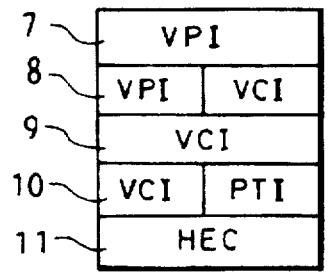
FIG. 2 shows the format of an ATM cell header.

To this end, the header of each cell comprises, as can be seen in FIG. 2, four zones VPI, VCI, PTI and HEC distributed in a block of five bytes, each having eight bits, these bytes being referenced as 7 to 11. One and a half bytes (VPI) are reserved for the encoding of the virtual path to which the cell belongs.

Two bytes (VCI) are reserved for the encoding of the virtual channel to which the cell belongs. The zone PTI has four bits whose use is not defined herein. Finally, the zone HEC has one byte reserved to generate an error control code.

Figure 3:
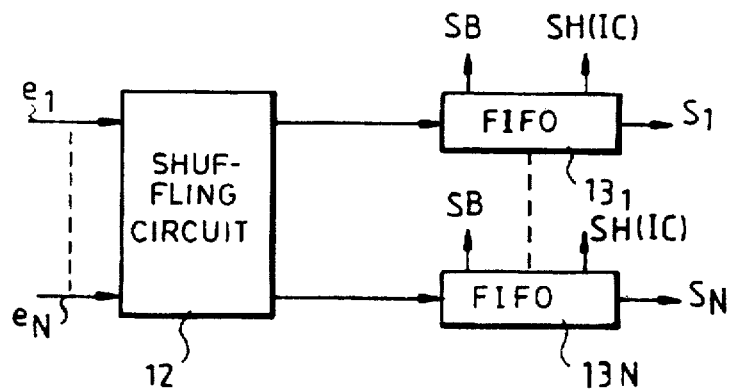
FIG. 3 shows an embodiment of a wired automaton for the implementation, in each node of the network, of the method according to the invention.

As shown in FIG. 3, each node has a shuffling circuit 12 of the type described for example in the patent applications FR 2 635 243 or FR 2 635 242. The role of the shuffling circuit 12 is to route the cells that enter by its entrances $e_1$–$e_N$ to the outgoing arteries of the node according to the information elements VPI and VCI contained in each header. The routing takes place in a known way, as described for example in the patent application 2 681 164, by the use of a translator. For each cell, the translator gives a new header and an outgoing artery as a function of the header that it possesses at its entry into the node and the artery that has conveyed it. The shuffling circuit 12 is connected to the outgoing arteries by means of registers $13_1$ to $13_N$ organized in a stack. These registers place the cells to be transmitted on each of the outgoing arteries $S_1$–$S_N$ of the node in a queue. To this end, each queue is organized in a register $13_i$ according to the FIFO (FIRST-IN FIRST-OUT) mode. To implement the invention, the registers $13_i$, in a known way, have a filling sensor with two thresholds, one top threshold referenced SH and one bottom threshold referenced SB.

When the end of the queue in one of the output directions of the node reaches or goes beyond the top threshold SH, for each virtual channel (identified for example by the field VCI of the cells that it transmits) on which a cell arrives, there is placed a type 1 Boolean congestion indicator for example in the translator (which therefore makes an internal report to the effect that the output used by the virtual channel considered is being congested). This information is also sent to the upline node corresponding to the logic channel on which the cell has been received, in the form of a congestion indicator IC, for example by means of a cell specifically sent out for this purpose.

The reception of the congestion indicator IC in a node prompts the setting, at the maximum value, of a type 2 congestion indicator (for example of the natural integer type) associated (for example in the translator) with the virtual channel that has encountered the type 1 congestion in the downline node. This indicator therefore reports that the path is saturated downline. Each node makes a cyclical transmission, in the upline direction, of the value of the congestion indicators IC (whether positioned or not) corresponding to each of the logic channels. Each node makes a cyclical decrementing of the type 2 congestion information whose value is not zero (for example). The cells belonging to a logic channel whose type 2 indicator is not at the value zero (for example) are blocked. When the queue of a congested node returns to the bottom threshold level SB, the type 1 congestion indicator is positioned in the "not congested" position. This change in state is transmitted to the upline nodes which then position the type 2 congestion counter at its minimal value (for example zero).

Figure 4:
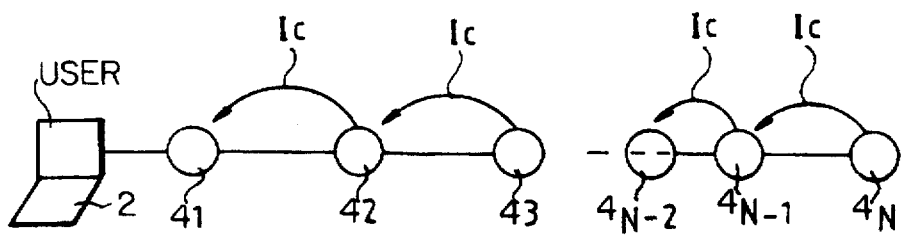
FIG. 4 shows an example to illustrate the principle of a connection according to the invention on cascade-connected nodes.

The congestion indicator IC is then transmitted from one node to the next, as shown in FIG. 4, to all the upline nodes through which the cell has been transmitted so as to be stored in each of the zones $VC_i$ of the corresponding translators.

This storage enables a report to be given, in the nodes of the network, pertaining to the congested virtual channels covered by them.

In one variant, for a given node, the upline nodes are informed cyclically not only about the type 1 state of congestion (IC) as described here above, but also of the type 2 state of congestion in such a way that the said upline nodes in turn stop the traffic on the concerned logic channels.

What is claimed is:

1. A method for controlling congestion in sporadic exchanges of packets of data in a digital transmission network, each packet including 1) a header enabling the each packet to be identified and to be guided through virtual channels and 2) a part containing information elements to be conveyed, the method comprising the steps of:

detecting, at each node of the network, virtual channels that are congested;

transmitting to nodes upline with respect to each congested virtual channel detected, a congestion indicator including an account value to stop connections on the each congested virtual channel so long as congestion observed by a node on channel has not been cleared;

decrementing the account value of the each congested virtual channel when there are no transmissions from other nodes; and resuming communication on the each congested virtual channel when the account value is zero after decrementing.

2. A device for controlling congestion in sporadic exchanges of packets of data in a digital transmission network, each packet of data including 1) a header enabling the each packet to be identified and to be guided through virtual channels and 2) a part containing information elements that are to be conveyed, the digital transmission network including transmission nodes communicating with one another on transmission arteries, the device comprising;

a shuffling circuit for distributing, on outgoing arteries, data packets applied to incoming arteries;

a set of registers, including plural queues, organized in stacks and interposed between the shuffling circuit and the outgoing arteries, to place the data packets to be transmitted in the plural queues;

a measurer for measuring lengths of the queues; and means for providing an indication, using the length of each of the plural queues, of the virtual channels of transmission that are congested.

3. A device according to claim 2, wherein each register of the set of registers includes a filling register with a top threshold and a bottom threshold.

4. A device according to claim 2, further comprising a translator to update the header of the data packets to be transmitted and to record the virtual channels congested upon reception of a congestion indicator given by one of the top and bottom thresholds of the nodes downline.

* * * * *